US008723911B1

United States Patent
Shochet

(10) Patent No.: US 8,723,911 B1
(45) Date of Patent: May 13, 2014

(54) SYSTEMS AND METHODS FOR ENHANCING RECORDED OR INTERCEPTED CALLS USING INFORMATION FROM A FACIAL RECOGNITION ENGINE

(75) Inventor: Ofer Shochet, Tel Aviv (IL)

(73) Assignee: Verint Americas Inc., Alpharetta, GA (US)

( * ) Notice: Subject to any disclaimer, the term of this patent is extended or adjusted under 35 U.S.C. 154(b) by 1114 days.

(21) Appl. No.: 12/245,785

(22) Filed: Oct. 6, 2008

(51) Int. Cl.
*H04N 7/14* (2006.01)

(52) U.S. Cl.
USPC ....................................... 348/14.01

(58) Field of Classification Search
USPC .......................... 348/14.01–14.08
See application file for complete search history.

(56) References Cited

U.S. PATENT DOCUMENTS

| 7,564,476 B1 * | 7/2009 | Coughlan et al. | 348/14.08 |
| 2004/0193740 A1 * | 9/2004 | Kasmirsky et al. | 710/1 |

* cited by examiner

*Primary Examiner* — Maria El-Zoobi
(74) *Attorney, Agent, or Firm* — Meunier Carlin & Curfman

(57) ABSTRACT

A video stream from a webcam or video telephone is received. The video stream can be analyzed in real-time as it is being received or can be recorded and stored for later analysis. Information within the video streams can be extracted and processed by a facial and video content recognition engine and the information derived therefrom can be stored as metadata. The metadata can be used for enriching the call content recorded by a recorder. The information derived from the video streams can be used to solve business and legal issues.

15 Claims, 4 Drawing Sheets

SYSTEMS AND METHODS FOR ENHANCING RECORDED OR INTERCEPTED CALLS USING INFORMATION FROM A FACIAL RECOGNITION ENGINE

TECHNICAL FIELD

The present disclosure is generally related to recording capabilities in a communications network, and more particularly, is related to enhancing recorded or intercepted calls using information from a facial recognition engine.

BACKGROUND

A call center is a centralized office that receives and transmits a large number of requests by telephone. A call center may provide product support or information requested by consumers. Outgoing calls may be made for telemarketing and debt collection. A call center is often operated by call center agents having work stations that include a computer for each agent and a telephone set/headset (telset) connected to a telecommunications switch. The call center may be independently operated or may be networked with additional centers. It may be linked to a corporate computer network that includes numerous computers and local area networks (LANs). Voice and data pathways into the center are frequently linked through technologies called computer telephony integration (CTI).

Most major businesses use call centers to interact with their customers. Examples include utility companies and mail order catalog firms. Customer support for computer hardware and software businesses are also frequently operated via call centers. All types of businesses sometimes service internal functions such as help desks and sales support through call centers.

The calls received or intercepted by a call center may be recorded. Covert monitoring of telephone and Internet conversations by a third party is sometimes called telephone tapping or wiretapping. Legalized wiretapping by police or other recognized governmental authorities is called lawful interception. Using the existing Public Switched Telephone Network (PSTN), Wireless, and Cable Systems, lawful interception is generally performed by accessing the digital switches supporting the target's calls. A good lawful interception system provides transparent (undetected) interception of specified traffic only.

Call data (known as Intercept Related Information or IRI in Europe and Call Data or CD in the US) includes information about the targeted communications, including destination of a voice call (e.g., called party's telephone number), source of a call (caller's telephone number), time of the call, duration, etc. Call content refers to the stream of data carrying the call. A lawful interception management function covers interception session set-up and tear down, scheduling, target identification, and so on. Voice over Internet Protocol (VoIP) has its own call data, including data derived from Session Initiation Protocol (SIP) messages that are used to set up and tear down a VoIP call. Passive wiretapping observes call data flow and gathers information. Active wiretapping attempts to alter the data or the flow of data.

Call recording software or call logging software allows a party to record a telephone conversation, whether PSTN or VoIP, to a digital file format. Reasons for recording call traffic include: reducing company vulnerability to lawsuits by maintaining recorded evidence, complying with laws, increasing security, training employees, providing performance reviews, verifying data, sharing data, improving customer satisfaction and so on.

A facial recognition system is a computer application for programmatically identifying or verifying a person from a digital image or a video frame from a video source. In some systems, selected facial features from the image are compared to a database of cataloged facial features. Some facial recognition algorithms identify faces by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face detection. A probe image is then compared with the face data. Popular recognition algorithms include eigenface, fisherface, the Hidden Markov model, and the neuronal motivated dynamic link matching algorithm.

Three-dimensional facial recognition uses three dimensional sensors to capture information about the shape of a face and is then used to identify distinctive features on the surface of a face, such as the contour of the eye sockets, nose, and chin. Three-dimensional facial recognition is not affected by changes in lighting like other techniques may be. It can also identify a face from a range of viewing angles, including a profile view. Another technique uses the visual details of the skin, as captured in standard digital or scanned images. This technique, called skin texture analysis, turns the unique lines, patterns, and spots apparent in a person's skin into a mathematical space.

SUMMARY

A video stream is received. The video stream can be analyzed in real-time as it is being received or can be recorded and stored for later analysis. Information within the video streams can be extracted and processed by a facial and video content recognition engine and the information derived therefrom can be stored as metadata. The metadata can be queried for statistical data and/or for business or security analysis. The metadata can be used to enrich the call content of a recorded or intercepted call. The information derived from the video streams can be used to determine whether or not the call should be recorded.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Video-telephone handsets and webcams have the capability to transmit a live video stream of the person who is talking and/or the person's surroundings. The live video stream can be analyzed in real-time. When a call is recorded for lawful interception, compliance, signal intelligence purposes or for call center efficiency, the recorded video can also be stored for later analysis. Information within the video streams can be extracted, processed, and stored as metadata. The metadata can be used for enriching the call content recorded by the recorder. The information derived from the video streams can be used to solve business and legal issues.

For example, legislation in the United States requires that calls between a person and his/her spouse or between a client and a lawyer are not recorded. To verify that a telephone conversation is taking place between spouses or between client and lawyer, a human must listen to the call to determine if the call should or should not be recorded. Furthermore, a human must periodically sample the call at specified intervals to determine if the parties in attendance on the call have changed to determine if the decision to record or not record the call should change. Using a facial and video content recognition engine, determination of whether a call should or should not be recorded can be programmatically determined and programmatically re-evaluated. Furthermore, a speaker change can be detected by the information received from the facial and video content recognition engine, eliminating the need for human polling. Information received from the facial and video content recognition module may be matched to a data store of known persons to determine if the call should be recorded or not.

Additionally, when recording a call between a suspect to an unknown number, the person at the unknown number may be identified using the facial image. For business uses, a caller change can be identified in order to identify non-standard events during the conversation. Facial landmarks or other data can be used to match against information stored from previous recorded calls to ease identification. Information concerning objects or locations may also be derived by the facial and video content recognition engine.

Figure 1:
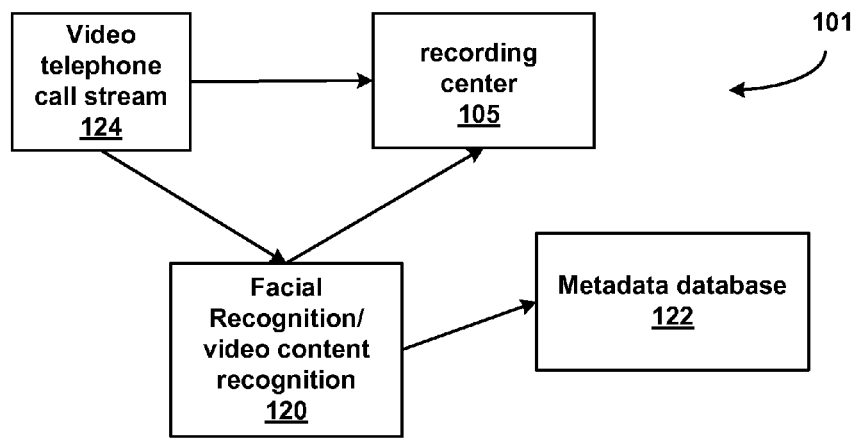
FIG. 1 is a block diagram that illustrates a system for enhancing recorded or intercepted calls using information from a facial recognition engine in accordance with aspects of the subject matter disclosed herein.

FIG. 1 is a block diagram of an example of a system 101 for using information from a facial recognition module to determine if a call should be recorded or not recorded and for enhancing the call content of a recorded call, in accordance with aspects of the subject matter disclosed herein. System 101 may reside in whole or in part on one or more computers such as computer 512. Computer 512 may be a computer such as the one described below with respect to FIG. 5. System 101 may include one or more of the following: a facial recognition/video content recognition module (engine) 120, a recording center 105, and a data store or database for metadata 122.

Facial recognition module 120 may receive a video telephone call stream 124 from a video telephone and may analyze the call stream. Facial recognition module 120 may extract information from the video call stream 124. The extracted information may be sent to recording center 105 for recording. The extracted information may be processed by facial recognition module 120 and the results sent to recording center 105. Extracted information and/or extracted and processed information may be stored in metadata data store 122.

Figure 2:
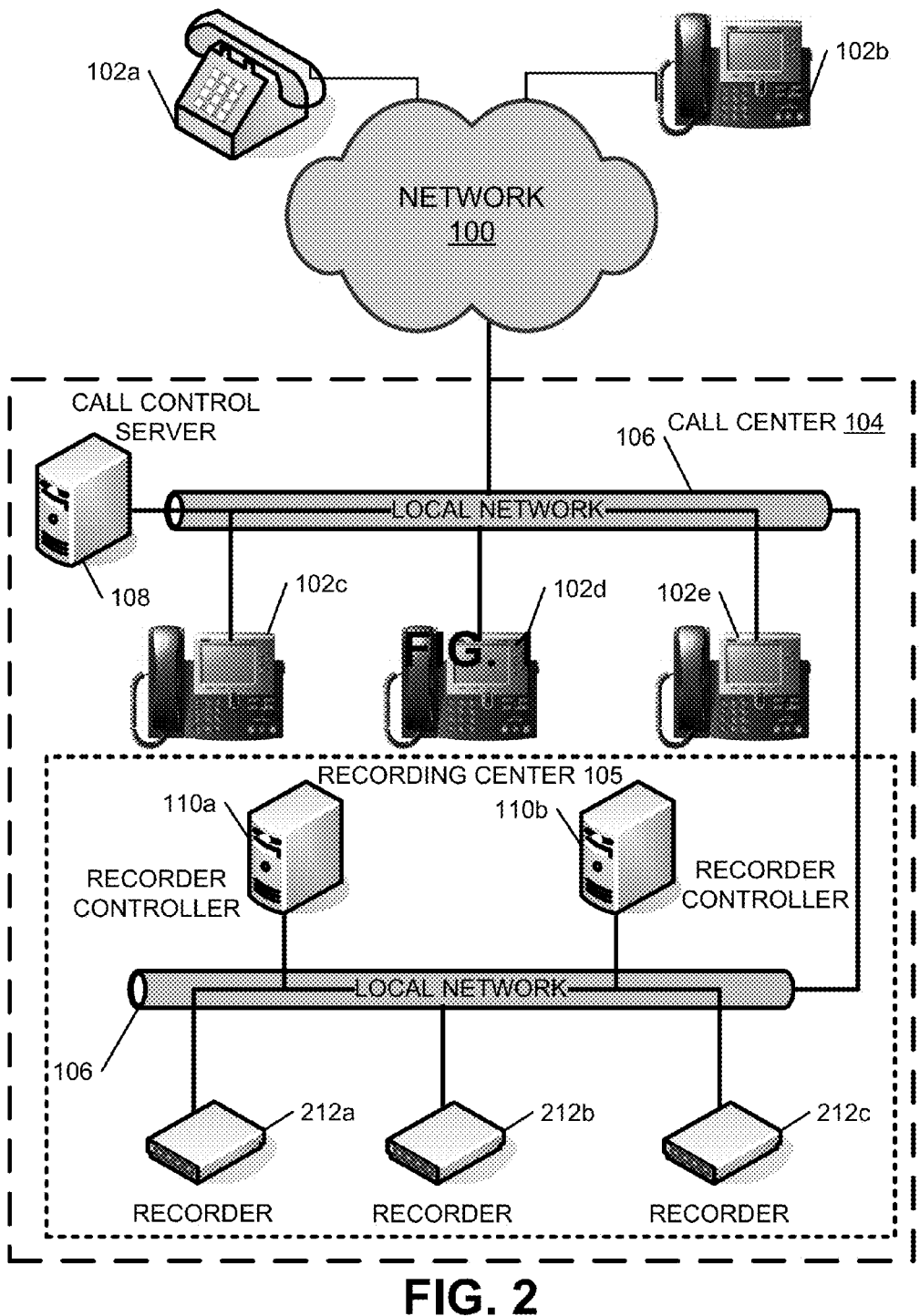
FIG. 2 is an example of a network configuration for recording a communication such as a video and/or audio call stream in accordance with aspects of the subject matter disclosed herein.

FIG. 2 is an example of a network configuration for recording a communication such as a video and/or audio call stream. Communications devices 102a, 102b may be coupled to a network 100. Communications devices 102a, 102b may be IP-based telephones, Public Switched Telephone Network (PSTN) based telephones, cellular telephones, and/or SIP-based telephones and may have video streaming capabilities. Additionally, network 100 may include one or more networks, such as a PSTN, an IP network (such as the Internet, an Intranet, etc.), a cellular network, an ISDN, and/or other networks.

Coupled to network 100 may be a call center 104. Call center 104 may be coupled to network 100 via local network 106, however this is not a requirement. Call center 104 may be configured to provide customer service to users on communications devices 102a, 102b via agents on communications devices 102c, 102d, and/or 102e. Coupled to local network 106 may be a call control server 108 that is configured to receive a communication and to determine where to route the received communication. Call control server 108 may also include other logic for facilitating communications with call center 104.

Coupled to local network 106 may be one or more recorder controllers such as recorder controllers 110a and 110b, etc. and/or one or more recording centers such as recording center 105. Recorder controller(s) 110a, 110b, etc. may be configured to receive a communication and determine a technique for recording the communication. Recorder controllers 110a, 110b, etc. may include recording logic for recording a communication between one or more of the communications devices 102c, 102d, and 102e and communications devices 102a and 102b. Recording center 105 may be configured as a Session Initiation Protocol (SIP) recording center and may include recorder controllers such as recorder controllers 110a, 110b, etc. Recorder controllers 110a, 110b, etc. may include recording logic, as discussed above and/or may include routing logic for receiving data related to a communication and determining to which recorder 212a, 212b, and/or 212c to send the data for recording. Recorders 212a, 212b, and 212c may be configured to record data associated with a communication among communications devices 102a, 102b, etc.

Utilization of a plurality of recorders may provide fail-over protection, load balancing, and/or link protection to the attached recorders, as illustrated in U.S. patent application Ser. No. 11/395,497, filed Mar. 31, 2006 and U.S. patent application Ser. No. 11/394,409, filed Mar. 31, 2006, which are each incorporated by reference in their entireties.

Figure 3:
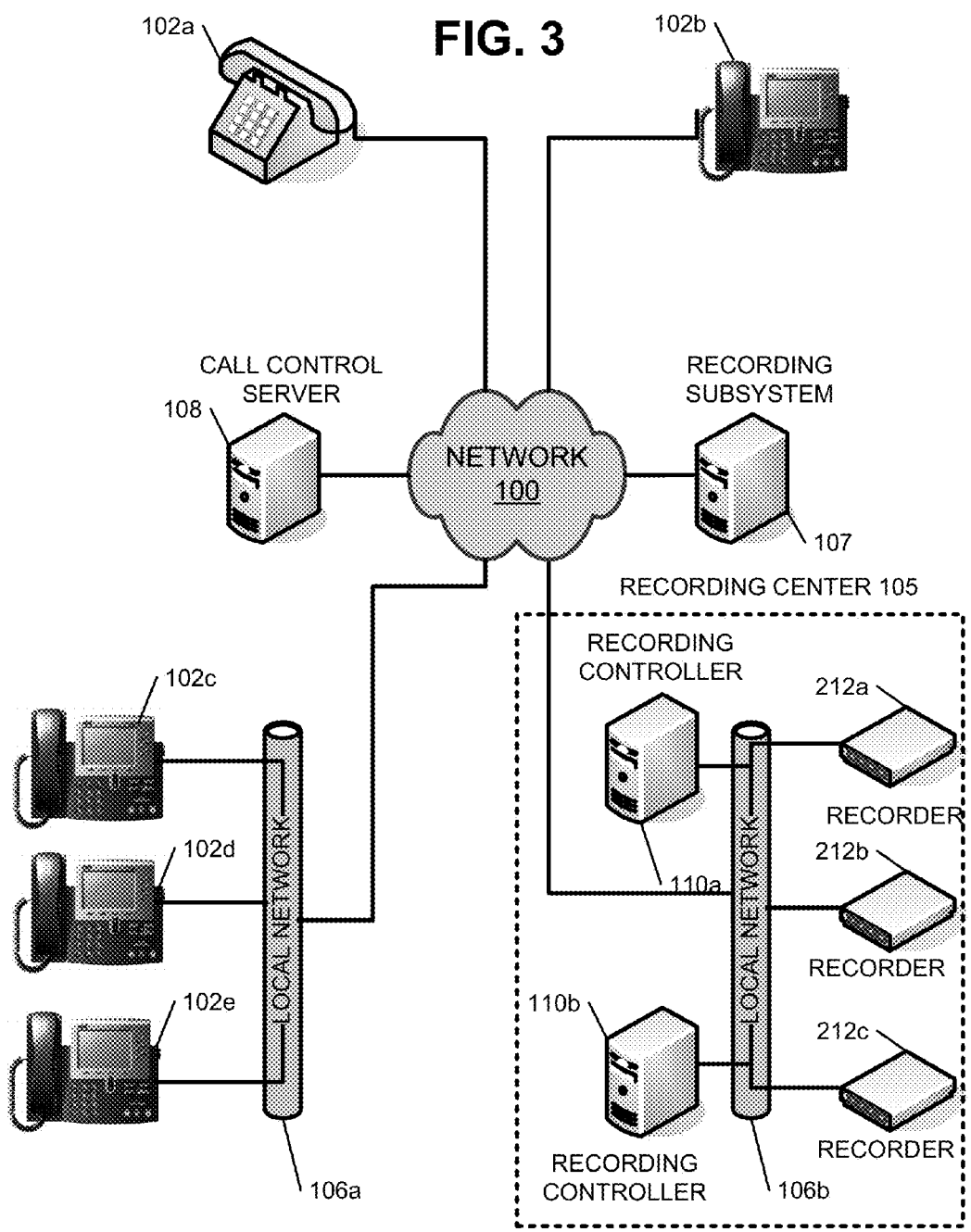
FIG. 3 is another example of a network configuration for recording a communication such as a video and/or audio call stream in accordance with aspects of the subject matter disclosed herein.

FIG. 3 is an exemplary embodiment of a network configuration for recording a communication, utilizing a distributive network configuration, similar to the network configuration from FIG. 2. As illustrated in the non-limiting example of FIG. 3, communications devices 102a, 102b, etc. are coupled to network 100. Also coupled to network 100 are call control server 108 and recording subsystem 107. While recording subsystem 107 is illustrated as being associated with a distributed network configuration, this example is illustrative rather than limiting. More specifically, recording subsystem 107 may be associated with configurations similar to the configurations of FIG. 2. Similarly, while recording subsystem 107 is illustrated as a separate component, recording subsystem 107 may be included with the logic of recording controller 110a or 110b, and/or be included with one or more other network configurations. Further, recording subsystem 107 may be configured to subscribe to a communications device and/or a system associated with a call center, as discussed in more detail below.

Additionally coupled to network 100 may be a local network 106a, which is coupled to agent communications devices 102c, 102d, and 102e. Network 100 may also be coupled to recording center 105, via local network 106b. Local network 106b may be coupled to a plurality of recorder controllers 110a, 110b, etc. and to a plurality of recorders 212a, 212b, and 212c.

It will be appreciated that any configuration of network components can be arranged in a distributed manner. For example, recording subsystem 107 may be coupled to a local network 106, while one or more recording controllers 110a, 110b, etc. may be directly coupled to network 100. Other configurations are also contemplated.

Figure 4A:
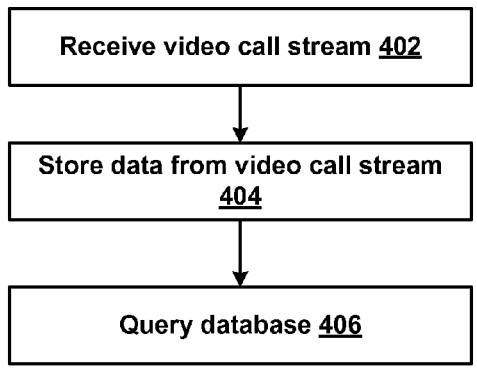
FIGS. 4a and 4b illustrate examples of methods of enhancing recorded or intercepted calls using information from a facial recognition engine in accordance with aspects of the subject matter disclosed herein.

FIG. 4a illustrates a method of enhancing recorded or intercepted calls using information from a facial recognition engine in accordance with aspects of the subject matter disclosed herein. In operation, a video telephone may generate a video call stream that is directed to a call center or is intercepted for potential recording. At 402, the video call stream may be received by a facial or video content recognition module or subsystem. The video call stream may also be directed to a recording subsystem for recording. The facial or video content recognition module or subsystem may extract information from the video data stream or otherwise process the video data stream. At 404 Information derived from the facial or video content recognition module or subsystem may be stored in a metadata database and/or may be sent to recording subsystem. Recording subsystem may use the information sent to it from facial or video content recognition module or subsystem to enhance the call content of a recorded call, and so on. Information derived from facial and video content recognition module may be stored in a database and at 406 queries and statistical information can be extracted from the database. For example, the database may provide results to queries such as but not limited to: number of female callers or called parties, number of male callers or called parties, age of callers or called parties, and so on.

Figure 4B:
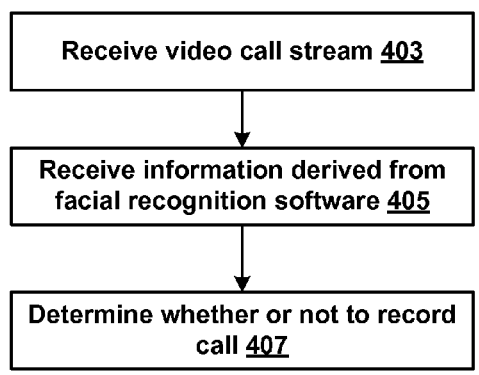

FIG. 4b illustrates a method of enhancing recorded or intercepted calls using information from a facial recognition engine in accordance with aspects of the subject matter disclosed herein. In operation, a video telephone may generate a video call stream that is directed to a call center or is intercepted for potential recording. At 403 the video call stream may be received by a facial or video content recognition module or subsystem. The video call stream may also be directed to a recording subsystem for recording. The facial or video content recognition module or subsystem may extract information from the video data stream or otherwise process the video data stream. At 405 Information derived from the facial or video content recognition module or subsystem may be used by the recording subsystem to enhance a recorded call. Recording subsystem may use the information sent to it from facial or video content recognition module or subsystem to determine whether or not to record a conversation, whether or not to start, stop or pause the recording of a conversation, whether to suspend the call and so on. Information derived from facial and video content recognition module may be stored in a database and at 407 queries and statistical information can be extracted from the database. For example, the database may provide results to queries such as but not limited to: number of female callers or called parties, number of male callers or called parties, age of callers or called parties, and so on.

Example of a Suitable Computing Environment

Figure 5:
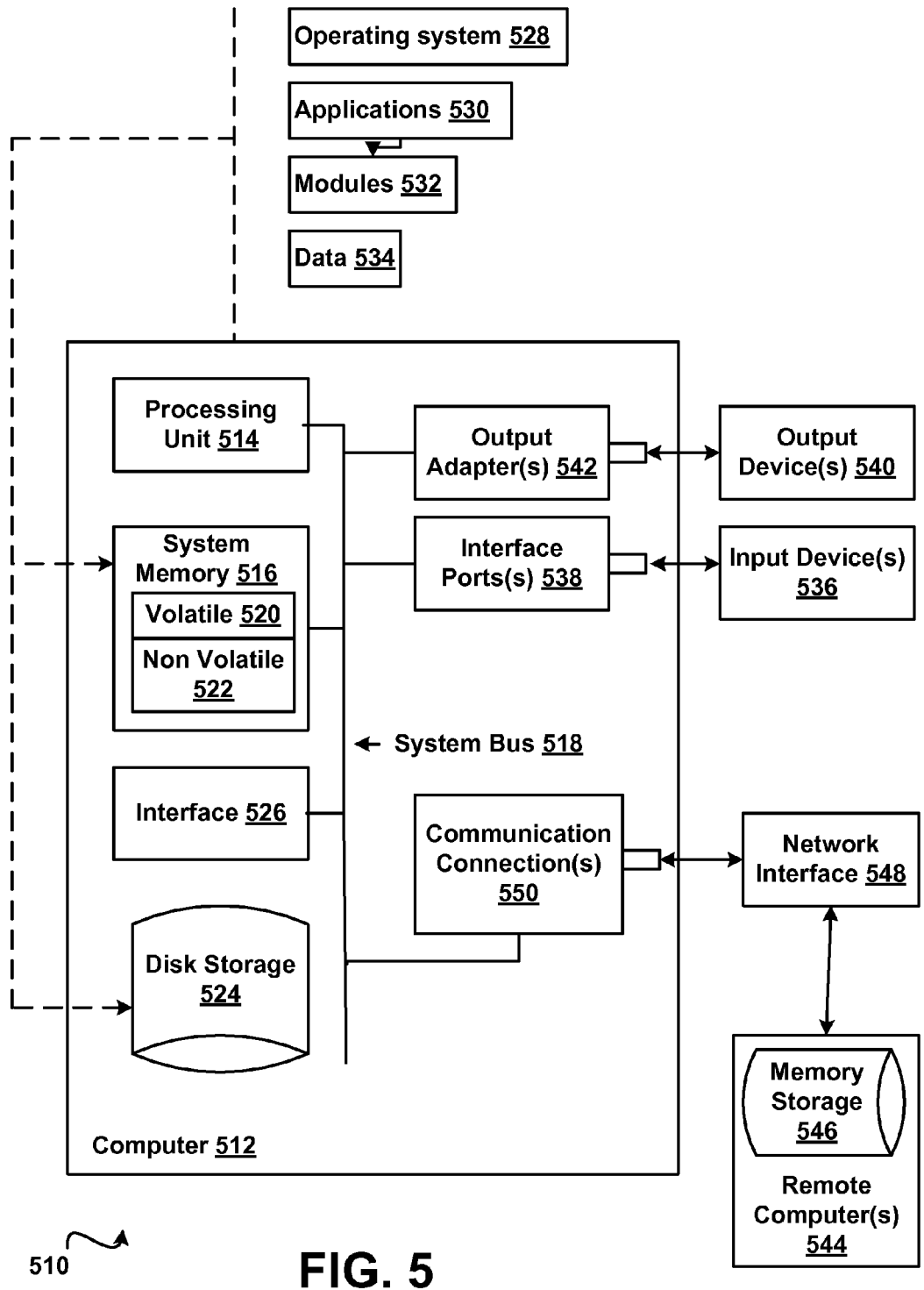
FIG. 5 is a block diagram of an example of a computer on which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 5, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512. Disk storage 524 may be connected to the system bus 518 through a non-removable memory interface such as interface 526.

It will be appreciated that FIG. 5 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the disclosed principles of the systems and methods. All such modifications and variations are intended to be included herein within the scope of this disclosure and the present disclosure and protected by the following claims.

The following is claimed:

1. A method for enhancing call content of a telephone call to be recorded using information from facial and video content recognition engine comprising:
   receiving a video stream with the telephone call;
   receiving results from the facial and video content recognition engine, the facial and video content recognition engine extracting information from the video stream and analyzing the extracted information to supply the results as metadata associated with the telephone call;
   storing the metadata in a data store; and
   recording the telephone call in accordance with information extracted from the metadata,
   wherein the metadata is used to determine if the telephone call should or should not be recorded or to determine whether the telephone call should be suspended, and
   wherein the analyzing of the extracted information occurs in real time as the telephone call is being received.

2. The method of claim 1, wherein the metadata is queried for statistical information.

3. A non-transitory computer-readable storage medium comprising computer-readable instructions that when executed:
   receive a video stream with an intercepted telephone call;
   receive results from a facial and video content recognition module, wherein the facial and video content recognition module extracts information from the video stream, analyzes the extracted information and sends results of analyzing the extracted information to a recording subsystem; and
   use the received results in real-time to determine programmatically whether the intercepted telephone call should be recorded or should not be recorded or to determine programmatically whether the intercepted telephone call should be suspended.

4. The computer-readable storage medium of claim 3, comprising further computer-readable instructions that when executed:
   record the intercepted call in response to a programmatic determination that the intercepted call should be recorded.

5. The computer-readable storage medium of claim 3, comprising further computer-readable instructions that when executed:
   do not record the intercepted call in response to a programmatic determination that the intercepted call should be recorded or suspend the telephone call in response to a programmatic determination that the intercepted telephone call should be suspended.

6. The computer-readable storage medium of claim 3, comprising further computer-readable instructions that when executed:
   detect a speaker change programmatically.

7. The computer-readable storage medium of claim 6, comprising further computer-readable instructions that when executed:
   start recording the intercepted telephone call in response to detecting the speaker change programmatically.

8. The computer-readable storage medium of claim 6, comprising further computer-readable instructions that when executed:
   stop recording the intercepted telephone call in response to detecting the speaker change programmatically.

9. A system comprising:
   a recording subsystem that receives information from a facial and video content recognition module, the information extracted from a video data stream of a telephone call and analyzed by the facial and video content recognition module, wherein the recording subsystem:
   uses the received information to determine that the telephone call should or should not be recorded or to determine whether the telephone call should be suspended; and
   uses the received information to enhance call content of the recorded call, wherein the telephone call is an intercepted telephone call, and wherein the facial and video content recognition module extracts information from the video data stream in real time, and analyzes the extracted information in real time to produce results from which a programmatic determination by the facial and video content recognition module is made to record the telephone call.

10. The system of claim 9, further comprising:

a data store that stores the received information as metadata.

11. The system of claim 10, wherein the data store is searchable.

12. The system of claim 9, wherein the facial and video content recognition module periodically provides the results to the recording system from which the programmatic determination to record the telephone call is re-evaluated.

13. The system of claim 9, wherein the facial and video content recognition module extracts information from the video data stream in real time, and analyzes the extracted information in real time to produce results from which a programmatic determination is made to not record the telephone call.

14. The system of claim 13, wherein the facial and video content recognition module periodically provides the results to the recording system from which the programmatic determination to not record the telephone call is re-evaluated.

15. The system of claim 9, further comprising a facial and video content recognition data store, wherein the received information is matched against the video content recognition data store for identification.

* * * * *